US00RE46355E

(19) United States
(12) Reissued Patent
Maurya et al.

(10) Patent Number: US RE46,355 E
(45) Date of Reissued Patent: Mar. 28, 2017

(54) METHOD AND SYSTEM FOR DISTRIBUTING AND UPDATING SOFTWARE IN WIRELESS DEVICES

(71) Applicant: Good Technology Holdings Limited, Waterloo (CA)

(72) Inventors: Sanjiv Maurya, Fremont, CA (US); Chih-Yu Chow, Palo Alto, CA (US); Tony Robinson, Palo Alto, CA (US)

(73) Assignee: Good Technology Holdings Limited, Waterloo, Ontario (CA)

(21) Appl. No.: 14/106,534

(22) Filed: Dec. 13, 2013

Related U.S. Patent Documents

Reissue of:
(64) Patent No.: 8,078,157
Issued: Dec. 13, 2011
Appl. No.: 12/577,428
Filed: Oct. 12, 2009

U.S. Applications:
(63) Continuation of application No. 11/363,582, filed on Feb. 27, 2006, now Pat. No. 7,620,392.

(51) Int. Cl.

| | |
|---|---|
| ***H04M 3/00*** | (2006.01) |
| ***H04M 1/00*** | (2006.01) |
| ***H04M 1/725*** | (2006.01) |
| ***G06F 9/445*** | (2006.01) |
| ***G06F 9/44*** | (2006.01) |

(52) U.S. Cl.
CPC ..... *H04M 1/72525* (2013.01); *G06F 8/65* (2013.01); *G06F 9/4448* (2013.01); *H04M 2250/58* (2013.01)

(58) Field of Classification Search
CPC ..... G06F 8/65
USPC ..... 455/418
See application file for complete search history.

(56) References Cited

U.S. PATENT DOCUMENTS

| | | | |
|---|---|---|---|
| 4,682,150 | A | 7/1987 | Mathes et al. |
| 4,882,752 | A | 11/1989 | Lindman et al. |
| 5,049,881 | A | 9/1991 | Gibson et al. |
| 5,115,392 | A | 5/1992 | Takamoto et al. |
| 5,126,739 | A | 6/1992 | Whiting et al. |
| 5,159,592 | A | 10/1992 | Perkins |

(Continued)

FOREIGN PATENT DOCUMENTS

| | | |
|---|---|---|
| EP | 0666651 | 8/1995 |
| EP | 0684558 | 11/1995 |

(Continued)

OTHER PUBLICATIONS

"Rarlabs Download Page", http://web.archive.orglweb/20020603234419/http://www.rarlab.comldownload.htm, Capture by Wayback Machine on Jun. 3, 2002, (1 pg.).

(Continued)

*Primary Examiner* — Angela M Lie
(74) *Attorney, Agent, or Firm* — Fish & Richardson P.C.

(57) ABSTRACT

A method is disclosed. The method includes receiving an update package from a wireless service provider that includes information indicating that multiple language versions of an update are included in the update package. Based on the information, the method further specifies an update associated with a language from the update package, and transmits the update associated with the language to a wireless device.

33 Claims, 6 Drawing Sheets

(56) References Cited

U.S. PATENT DOCUMENTS 5,220,501 A 6/1993 Lawlor et al.
5,237,614 A 8/1993 Weiss
5,321,840 A 6/1994 Ahlin
5,392,390 A 2/1995 Crozier
5,434,994 A 7/1995 Shaheen et al.
5,469,161 A 11/1995 Bezek
5,519,606 A 5/1996 Frid-Nielsen et al.
5,521,597 A 5/1996 Dimitri
5,553,281 A 9/1996 Brown et al.
5,559,800 A 9/1996 Mousseau et al.
5,563,595 A 10/1996 Strohacker
5,613,012 A 3/1997 Hoffman et al.
5,664,207 A 9/1997 Crumpler et al.
5,666,530 A 9/1997 Clark et al.
5,694,546 A 12/1997 Reisman
5,715,387 A 2/1998 Barnstijn et al.
5,721,907 A 2/1998 Pyne
5,727,159 A 3/1998 Kikinis
5,727,202 A 3/1998 Kucala
5,760,716 A 6/1998 Mathews et al.
5,771,010 A 6/1998 Masenas
5,787,441 A 7/1998 Beckhardt
5,790,974 A 8/1998 Tognazzini
5,793,970 A 8/1998 Fakes et al.
5,802,312 A 9/1998 Lazaridis et al.
5,809,415 A 9/1998 Rossmann
5,841,376 A 11/1998 Hayashi
5,850,517 A 12/1998 Verkler et al.
5,857,201 A 1/1999 Wright et al.
5,870,610 A 2/1999 Beyda
5,875,329 A 2/1999 Shan
5,903,230 A 5/1999 Masenas
5,903,881 A 5/1999 Schrader et al.
5,930,471 A 7/1999 Milewski et al.
5,961,590 A 10/1999 Mendez et al.
5,974,238 A 10/1999 Chase, Jr.
5,987,464 A 11/1999 Schneider
5,999,947 A 12/1999 Zollinger et al.
6,003,089 A 12/1999 Shaffer et al.
6,006,274 A 12/1999 Hawkins et al.
6,023,708 A 2/2000 Mendez et al.
6,034,621 A 3/2000 Kaufman
6,049,671 A 4/2000 Slivka et al.
6,052,735 A 4/2000 Ulrich et al.
6,065,017 A 5/2000 Barker
6,104,392 A 8/2000 Shaw et al.
6,111,707 A 8/2000 Buddecke et al.
6,151,606 A 11/2000 Mendez et al.
6,167,448 A 12/2000 Hemphill et al.
6,182,117 B1 1/2001 Christie et al.
6,216,157 B1 4/2001 Vishwanath et al.
6,218,970 B1 4/2001 Jaquette
6,219,694 B1 4/2001 Lazaridis et al.
6,226,618 B1 5/2001 Downs
6,259,891 B1 7/2001 Allen
6,275,848 B1 8/2001 Arnold
6,279,001 B1 8/2001 DeBettencourt et al.
6,304,881 B1 10/2001 Halim et al.
6,308,061 B1 10/2001 Criss et al. ..... 455/418
6,310,889 B1 10/2001 Parsons et al.
6,330,618 B1 12/2001 Hawkins et al.
6,343,299 B1 1/2002 Huang et al.
6,347,340 B1 2/2002 Coelho et al.
6,360,272 B1 3/2002 Lincke et al.
6,381,454 B1 4/2002 Tiedemann
6,384,850 B1 5/2002 McNally et al.
6,393,434 B1 5/2002 Huang et al.
6,396,482 B1 5/2002 Griffin et al.
6,401,136 B1 6/2002 Britton et al.
6,425,126 B1 7/2002 Branson et al.
6,430,601 B1 8/2002 Eldridge et al.
6,434,613 B1 8/2002 Bertram et al.
6,449,622 B1 9/2002 LaRue et al.
6,457,062 B1 9/2002 Pivowar et al.
6,460,055 B1 10/2002 Midgley et al.
6,463,463 B1 10/2002 Godfrey et al.
6,463,464 B1 10/2002 Lazaridis et al.
6,477,543 B1 11/2002 Huang et al.
6,496,979 B1 12/2002 Chen
6,505,055 B1 1/2003 Kahn et al.
6,535,892 B1 3/2003 LaRue et al.
6,571,245 B2 5/2003 Huang et al.
6,604,236 B1 8/2003 Draper et al.
6,615,253 B1 9/2003 Bowman-Amuah
6,625,621 B2 9/2003 Tan et al.
6,636,873 B1 10/2003 Carini et al.
6,640,244 B1 10/2003 Bowman-Amuah
6,654,746 B1 11/2003 Wong et al.
6,658,167 B1 12/2003 Lee et al.
6,671,757 B1 12/2003 Multer et al.
6,675,009 B1 1/2004 Cook
6,694,335 B1 2/2004 Hopmann et al.
6,697,458 B1 2/2004 Kunjibettu
6,701,378 B1 3/2004 Gilhuly et al.
6,721,019 B2 4/2004 Kono et al.
6,721,787 B1 4/2004 Hiscock
6,721,871 B2 4/2004 Piispanen et al.
6,735,434 B2 5/2004 Criss et al.
6,757,698 B2 6/2004 McBride et al.
6,779,019 B1 8/2004 Mousseau et al.
6,792,085 B1 9/2004 Rigaldies et al.
6,829,639 B1 12/2004 Lawson et al.
6,874,037 B1 3/2005 Abram et al.
6,901,415 B2 5/2005 Thomas et al.
6,907,243 B1 6/2005 Patel
6,931,454 B2 8/2005 Deshpande et al.
6,934,766 B1 8/2005 Russell
6,941,348 B2 9/2005 Petry et al.
6,941,349 B2 9/2005 Godfrey et al.
6,954,789 B2 10/2005 Dietz et al.
6,973,299 B2 12/2005 Apfel
6,976,263 B2 12/2005 Delaney
6,983,308 B1 1/2006 Oberhaus
7,003,776 B2 2/2006 Sutherland
7,073,137 B2 7/2006 Hassanin et al.
7,085,809 B2 8/2006 Mori et al.
7,092,699 B1 8/2006 Hefter
7,133,756 B2 11/2006 Jammu et al.
7,136,934 B2 11/2006 Carter et al.
7,139,555 B2 11/2006 Apfel
7,149,813 B2 12/2006 Flanagin et al.
7,155,483 B1 12/2006 Friend et al.
7,185,082 B1 2/2007 del Val et al.
7,239,877 B2 7/2007 Corneille et al.
7,257,649 B2 8/2007 Rabbers et al.
7,340,389 B2 3/2008 Vargas
7,356,510 B2 * 4/2008 Durand ..... G06F 21/10 705/50
7,467,167 B2 12/2008 Patterson
8,178,040 B2 * 5/2012 Brauer ..... 422/44
8,875,116 B2 * 10/2014 O'Neill et al. ..... 717/168
2001/0004744 A1 6/2001 Lazaridis et al.
2001/0005864 A1 6/2001 Mousseau et al.
2001/0010059 A1 7/2001 Burman et al.
2001/0029178 A1 10/2001 Criss et al.
2001/0034654 A1 10/2001 Vigil
2001/0044835 A1 11/2001 Schober et al.
2001/0046854 A1 11/2001 Henry et al.
2001/0049263 A1 12/2001 Zhang
2001/0053688 A1 12/2001 Rignell et al.
2001/0054115 A1 12/2001 Ferguson et al.
2002/0013853 A1 1/2002 Baber et al.
2002/0019225 A1 2/2002 Miyashita
2002/0032722 A1 3/2002 Baynes et al.
2002/0046286 A1 4/2002 Caldwell et al.
2002/0055355 A1 5/2002 Ikeda
2002/0085506 A1 7/2002 Hundscheidt
2002/0085719 A1 7/2002 Crosbie
2002/0099772 A1 7/2002 Deshpande
2002/0119793 A1 8/2002 Hronek
2002/0120696 A1 8/2002 Mousseau et al.
2002/0146240 A1 10/2002 Ogawa et al.
2002/0155829 A1 10/2002 Proctor
2002/0160773 A1 10/2002 Gresham et al.

(56) References Cited

U.S. PATENT DOCUMENTS

| | | | |
|---|---|---|---|
| 2003/0022661 | A1 | 1/2003 | Guterman |
| 2003/0046434 | A1 | 3/2003 | Flanagin et al. |
| 2003/0050046 | A1 | 3/2003 | Conneely |
| 2003/0069842 | A1 | 4/2003 | Kight |
| 2003/0081621 | A1 | 5/2003 | Godfrey et al. |
| 2003/0084165 | A1 | 5/2003 | Kjellberg |
| 2003/0097381 | A1 | 5/2003 | Detweiler |
| 2003/0097490 | A1 | 5/2003 | Delaney |
| 2003/0143991 | A1 | 7/2003 | Minear |
| 2003/0147369 | A1 | 8/2003 | Singh |
| 2003/0182326 | A1 | 9/2003 | Patterson |
| 2004/0002943 | A1 | 1/2004 | Merrill |
| 2004/0003266 | A1 | 1/2004 | Moshir |
| 2004/0034853 | A1 | 2/2004 | Gibbons |
| 2004/0054739 | A1 | 3/2004 | Friend et al. |
| 2004/0068665 | A1 | 4/2004 | Fox |
| 2004/0092255 | A1 | 5/2004 | Ji et al. |
| 2004/0098420 | A1 | 5/2004 | Peng |
| 2004/0098421 | A1 | 5/2004 | Peng et al. ..... 707/203 |
| 2004/0098715 | A1 | 5/2004 | Aghera |
| 2004/0105423 | A1 | 6/2004 | Koehler et al. |
| 2004/0109436 | A1 | 6/2004 | Vargas et al. |
| 2004/0203693 | A1 | 10/2004 | Mehta |
| 2004/0203941 | A1 | 10/2004 | Kaplan |
| 2004/0214599 | A1 | 10/2004 | Ogino |
| 2004/0246895 | A1 | 12/2004 | Feyerabend |
| 2005/0075115 | A1 | 4/2005 | Corneille |
| 2005/0132357 | A1 | 6/2005 | Shell |
| 2005/0148356 | A1 | 7/2005 | Ferguson et al. |
| 2005/0186952 | A1 | 8/2005 | Kitajima |
| 2005/0216534 | A1 | 9/2005 | Ikezawa |
| 2005/0254458 | A1 | 11/2005 | Proctor |
| 2006/0025123 | A1 | 2/2006 | Majmundar et al. |
| 2006/0043820 | A1 | 3/2006 | Nakahara |
| 2006/0046703 | A1 | 3/2006 | Liu |
| 2006/0073820 | A1 | 4/2006 | Craswell et al. |
| 2006/0106806 | A1 | 5/2006 | Sperling et al. |
| 2006/0129638 | A1 | 6/2006 | Deakin |
| 2006/0206537 | A1 | 9/2006 | Chiang |
| 2006/0217111 | A1 | 9/2006 | Marolia et al. |
| 2006/0229027 | A1 | 10/2006 | Wang et al. |
| 2006/0242621 | A1 | 10/2006 | Ye et al. |
| 2007/0042766 | A1 | 2/2007 | Herle |
| 2007/0083676 | A1 | 4/2007 | Rabbers |
| 2008/0125105 | A1 | 5/2008 | Qumei et al. |
| 2009/0013083 | A9 | 1/2009 | Garcia-Luna-Aceves |

FOREIGN PATENT DOCUMENTS

| | | |
|---|---|---|
| EP | 0909037 | 4/1999 |
| EP | 0917077 | 5/1999 |
| EP | 1014629 | 6/2000 |
| JP | 07-182263 | 7/1995 |
| JP | 10-269125 | 10/1998 |
| JP | 11-136365 | 5/1999 |
| JP | 2000148641 | 5/2000 |
| JP | 2001053785 | 2/2001 |
| JP | 2001076040 | 3/2001 |
| WO | 0067158 | 11/2000 |
| WO | 0219626 | 3/2002 |

OTHER PUBLICATIONS

Hild, Stefan G. "Mobilizing Applications", IEEE Personal Communications/ 1070-9916/97 (Oct. 1997), 26-34.
Airsoft, Inc., 1996, Powerburst: making remote access work, 9 pp.
Airsoft, Inc., Dec. 1995, Corporate Backgrounder, 5 pp.
Airsoft, Inc., Jun. 21, 1994, AirSoft AirAccess 2.0 Mobile Networking Software: Product Overview and Reviewer's Guide, 11 pp.
Anterior Technology Radiomail Gateway Services, Dec. 1991, Draft Application Program Interface Specification, Version 1.0 (Beta), 7 pp.
Barnstijn: Memo re MailCall and Radiomail integration, Research in Motion, 7 pp, Dec. 6, 1991.
Berners-Lee et al: Hypertext Transfer Protocol—HTTP/1.0, 60 pp, May 1996.
Business Wire, SkyTel and CompuServe team to provide wireless messaging services in countries worldwide; SkyTel adds to e-mail connectivity options it provides for business markets, 3 pp, May 1, 1991.
cc:Mail Inc., 1995, Lotus cc:Mail for the World Wide Web Release 1 Administrator's Guide, 78 pp.
cc:Mail Inc., 1994, Automatic Directory Exchange Release 2: Administrator's Guide, 76 pp.
CompuServe Incorporated, 1988, CompuServe Professional Connection Plus Message Management with Forms, Users Guide, 131 pp.
Crispin: RFC1730—Internet message access protocol—Version 4, Network Working Group, University of Washington, 55 pp. Dec. 1994.
Crocker: RFC 822—Standard for the format of ARPA Internet text messages, 43 pp, 1982.
Dahl, Andrew: Lotus Notes 4 Administrator's Survival Guide, Sams Publishing, pp. 49, 64-66, 1996.
Data Communications, Juicing up remote-node links to the LAN, pp. 108 and 110, Jan. 1996.
developerWorks Lotus, Web team, IBM,The History of Notes and Domino, 22 pp., Nov. 14, 2007.
GloMop Group, GloMop: Global Mobile Computing by Proxy, 12 pp., 1995.
Grous: Creating and Managing a Web Site with Lotus' InterNotes Web Publisher, The View, 17 pp., Sep. 1995.
Infinite Technologies, Administrator's Guide: WebMail Remote e-mail access via the world wide web, Release 1.0, 72 pp., 1996.
Infinite Technologies, User's Guide: Webmail Remote Email Access, 82 pp., 1996.
Infinite Technologies, WebMail Q&A, 5pp., 1996.
Infinite Technologies, Infinite InterChange: remote access to almost any LAN-based e-mail from anywhere, 170 pp., 1997.
Infinite Technologies, Infinite InterChange: remote access to almost any LAN-based e-mail from anywhere, 1 p., 1997.
Infinite Technologies, Introducing WebMail Presentation, 13 pp., 1997.
InfoKomp, WebMail Tech Notes: FYIs, 5 pp., 1996.
Internet Anywhere Consortium, Business Plan of Jul. 1, 1994, Information Technology Research Centre, Mortice Kern Systems Inc., Research in Motion Limited, 48 pp.
Internet Anywhere Consortium, Program Budget and Statement of Work, Information Technology Research Centre, Mortice Kern Systems Inc. Research in Motion Limited, 12 pp., Feb. 21, 1994.
Internet Anywhere Wireless Functional Specification, Research in Motion, Limited, 9 pp., 1994.
Kramer: Remote possibilities; gateways let remote users exchange mail via web browsers, 5 pp., 1999.
Kucharczyk, David: Memo re MailCall and Radiomail Integration, Research in Motion, 2 pp., Dec. 11, 1991.
Lamb et al.: Lotus Notes Network Design for Notes Release 3 and 4, McGraw-Hill, pp. 196-197, 1996.
Lambert: PCMail: A distributed mail system for personal computers, 38 pp., 1988.
Lazaridis: Viking Express document to Richard Kirby, 2pp., Jan. 23, 1992.
Libris Inc.: Libris AirNet Service, Specification Version 0.6b, 172 pp., Sep. 1995.
Lotus Development, Lotus Notes Release 4.5 Administrator's Guide, 748 pp., 1995.
Mathers et al: Lotus Notes Internet Cookbook for Notes Release 4, 37 pp., Feb. 14, 1996.
MKS Internet Anywhere Product Plan, 7.2.3 Release Schedule, 2 pp., 1994.
Mobilib-Plus Developers Kit: User Guide and Reference Manual, Version 2.2, Research in Motion Ltd., 80 pp.. Jun. 28, 1993.
MobilLib-Plus Product Brief: Preliminary interface specification for MobiLib-Plus session layer, Research in Motion Limited, 8 pp., Sep. 24, 1991.
Mobitex User's Handbook for the Mobiden AT, Version 1.0, Research in Motion, 66 pp., Apr. 1993.

(56) References Cited

OTHER PUBLICATIONS

Motorola Inc., Communication Client Guide: AirMobile Wireless Software for Lotus cc:Mail, 48 pp., 1995.
Motorola, AirMobile wireless software for cc:mail: e-mail from anywhere, 2 pp., 1995.
Motorola, Communication Server Guide: AirMobile Wireless Software for Lotus cc:Mail, 46 pp., 1995.
Pyle: A jump start for the top ten R3-toR4 migration consideration, The View, Wellesley Information Services, pp. 3-20, Nov.-Dec. 1995.
RAM Mobile Data, Inc., An Overview of the RAM Mobile Data, Inc. Mobitex Packet Radio Networks including a summary of radio/modern and terminal design requirements and guidelines for application specific software design, Issue 2, 61 pp., Aug. 1990.
Rennie: The Official Guide to Lotus Software: cc:Mail Plain and Simple, Sybex Inc., 293 pp., 1994.
Research in Motion Limited, Wireless Access to the Internet-Preliminary Functional Specification, 12 pp., 1994.
RIM/MKS/ITRC Canarie Partnership: Internet Anywhere Wireless Access to the Internet; PowerPoint slide, 1 pg., 1992.
Wong: Casahl's replic-action: delivering true notes/DMBS integration, The View, pp. 33-50, Jan./Feb. 1996.

* cited by examiner

METHOD AND SYSTEM FOR DISTRIBUTING AND UPDATING SOFTWARE IN WIRELESS DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[The present patent application] *This application is a reissue of U.S. Pat. No. 8,078,157. U.S. Pat. No. 8,078,157* is a [Continuation application claiming priority from] *continuation of U.S. patent* application Ser. No. 11/363,582, filed Feb. 27, 2006, now U.S. Pat. No. 7,620,392.

FIELD OF THE INVENTION

This invention relates generally to the field of wireless networks. More particularly, the invention relates to distributing and updating software in wireless devices.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Currently, in order to distribute software to wireless devices, the devices are cradled and/or connected to a computer system for software to be installed to a wireless device. Additionally, some software to be installed on the device may be language specific, or device specific. In this case software running on a computer system controls what version of the software is to be installed on the wireless device, or users may choose from a set of options provided.

BRIEF DESCRIPTION OF THE DRAWINGS

A better understanding of the present invention can be obtained from the following detailed description in conjunction with the following drawings, in which.

DETAILED DESCRIPTION

According to one embodiment a method for updating a wireless device is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
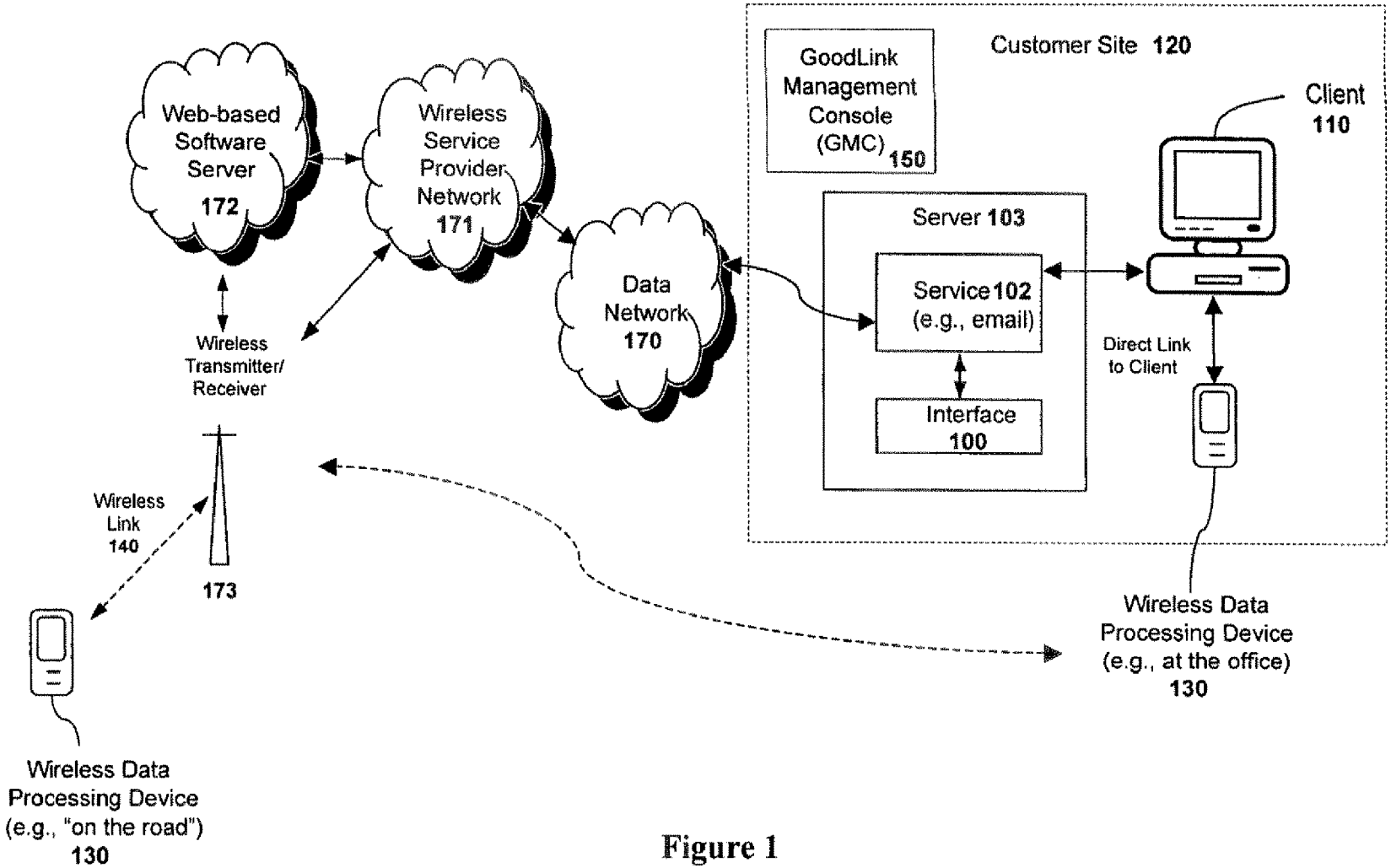
FIG. 1 illustrates one embodiment of a network.

FIG. 1 illustrates one embodiment of a network architecture. A "customer site" 120 is illustrated in FIG. 1 and may be any local-area or wide-area network over which a plurality of servers 103 and clients 110 communicate. For example, customer site 120 may include all servers and clients maintained by a single corporation.

Servers 103 may provide a variety of different messaging and groupware services 102 to network users (e.g., e-mail, instant messaging, calendaring, etc). In one embodiment, these services are provided by Microsoft Exchange.™ However, the underlying principles of the invention are not limited to any particular messaging/groupware platform.

In one embodiment, an interface 100 forwards data objects (e.g., e-mail messages, instant messages, calendar data, etc.) maintained by service 102 to a plurality of wireless data processing devices (represented in FIG. 1 by device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, service 102 may provide the e-mail to the user's local computer (e.g., client 110) upon request (e.g., so that the user will receive the e-mail on his/her device 130 when out of the office and on his/her personal computer 110 when in the office). Conversely, e-mail messages transmitted from the user's wireless data processing device 130 are transmitted to the service 102 via the interface 100.

In one embodiment, interface 100 is a software module adapted to work with the particular service 102. It should be noted, however, that interface 100 may be implemented in hardware or any combination of hardware and software while still complying with the underlying principles of the invention.

In one embodiment, the external data network 170 includes a plurality of databases, servers/clients (not shown) and other networking hardware (e.g., routers, hubs, etc) for transmitting data between the interface 100 and the devices 130. In one embodiment, the interface 100 encapsulates data in one or more packets having an address identifying the devices 130 (e.g., such as a 24-bit Mobitex Access Number ("MAN #")).

The external data network 170 transmits the packets to a wireless service provider network 171, which in turn, transmits the packets (or the data contained therein) over wireless communication link 173 (e.g. cell tower) to the device 130. In one embodiment, the wireless service provider network is a CDMA 2000 network. However, various other network types may be employed (e.g., Mobitex, GPRS, PCS, etc.) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment, customer site 120 includes a management console (MC) 150. In a further embodiment, MC 150 is a GoodLink™ management console (GMC) developed by Good Technology®. Further wireless service provider network 171 is connected to a web-based software server 172. In one embodiment, web-based software server 172 is a web-store, which is used to distribute updates and applications to wireless devices (e.g. device 130).

According to one embodiment, updates and/or applications for device 130 are transmitted to web-based software server 172 from wireless service provider network 171, which are available for download by device 130. In one embodiment, the application to be downloaded is GoodLink™ client developed by Good Technology®. In another embodiment, notification of the availability of updates and/or applications is transmitted to customer site 120. At customer site 120, MC 150 allows an administrator to assign software policies for device 130. In one embodiment, the software policies determine which update and/or application notifications device 130 will receive.

Based on the software policies, customer site 120 then transmits a message to device 130 notifying device 130 of the updates and/or applications that are available to be downloaded from web-based software server 172.

Figure 2:
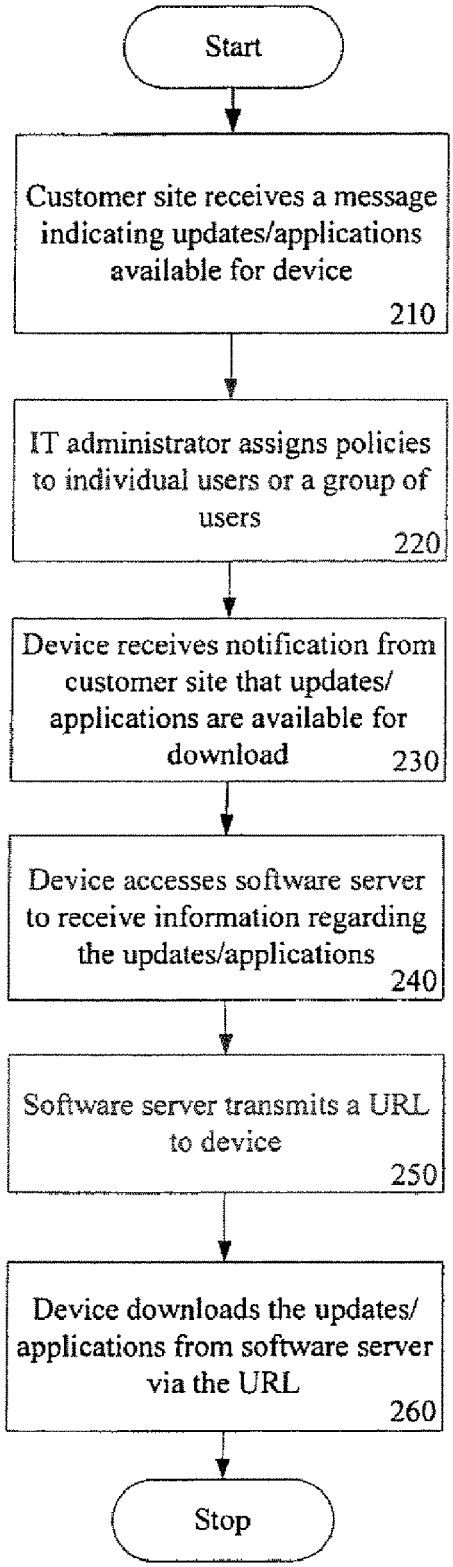
FIG. 2 illustrates one embodiment of a flow diagram for a wireless device downloading updates and/or applications from a web-based software server.

FIG. 2 illustrates one embodiment of a flow diagram illustrating the process of device 130 downloading updates and/or applications from web-based software server 172. At process block 210, customer site 120 receives a message indicating that there are updates and/or applications available for device 130 to download. At process block 220, an IT administrator assigns software policies to individual users and/or a group of users (e.g. device 130). In one embodiment, a software policy defines a rule, which uniquely identifies the updates and/or applications.

At process block 230, device 130, based on the software policy, receives notification from customer site 120 that updates and/or applications are available for download. At process block 240, device 130 accesses web-based software server 172 to receive information regarding the updates and/or applications. At process block 250, web-based software server 172 transmits a universal resource locator (URL) to device 130 that indicates the location of the updates and/or applications. At process block 260, device 130 downloads the updates and/or applications from web-based software server 172 via the received URL.

Downloading updates and/or applications from a web-based software server reduces the burden on the bandwidth of a data network by spreading out the time when devices will download an update and/or application is described.

Figure 3:
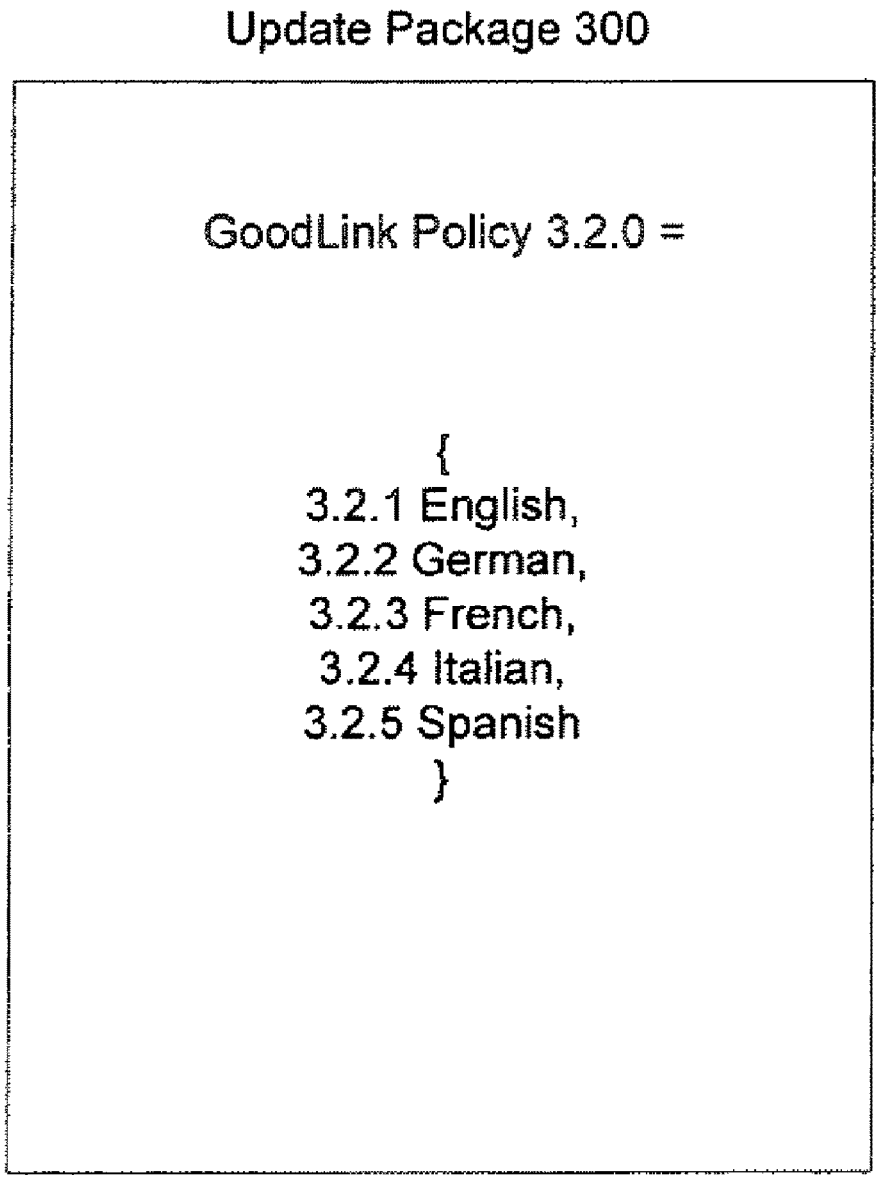
FIG. 3 illustrates one embodiment of an update package.

In another embodiment of the present invention a mechanism to distribute multi-language applications and updates in a package format is disclosed. FIG. 3 illustrates one embodiment of an update package 300. Update package 300 includes a similar software update provided in five different languages (i.e. English, German, French, Italian and Spanish). However, other languages and a different number of languages may be used.

In one embodiment, web-based software server 172 decides, based on information received from device 130, which one of the software updates in update package 300 that device 130 will receive. Accordingly, the device 130 receives the version of the update that corresponds to its specified language.

In one embodiment, update package 300 has a compatibility matrix included with it. This compatibility matrix is included in meta-data associated with update package 300. The compatibility matrix includes information describing the languages supported by update package 300. An IT administrator may use the information to know the content of update package 300.

The following is an example of one embodiment of a compatibility matrix:

```
ComparabilityMatrix =
{
    [locale=EN|GUID=Guid3_2_1]
    [locale=DE|GUID=Guid3_2_2]
    [locale=FR|GUID=Guid3_2_3]
    [locale=IT|GUID=Guid3_2_4]
    [locale=SP|GUID=Guid3_2_5]
}
```

The locale and GUID tags in the compatibility matrix are to identify rules that are associated with each update in update package 300. For example, 'locale=DE' is a rule that identifies that the update is designated for devices with German as the device language.

Figure 4:
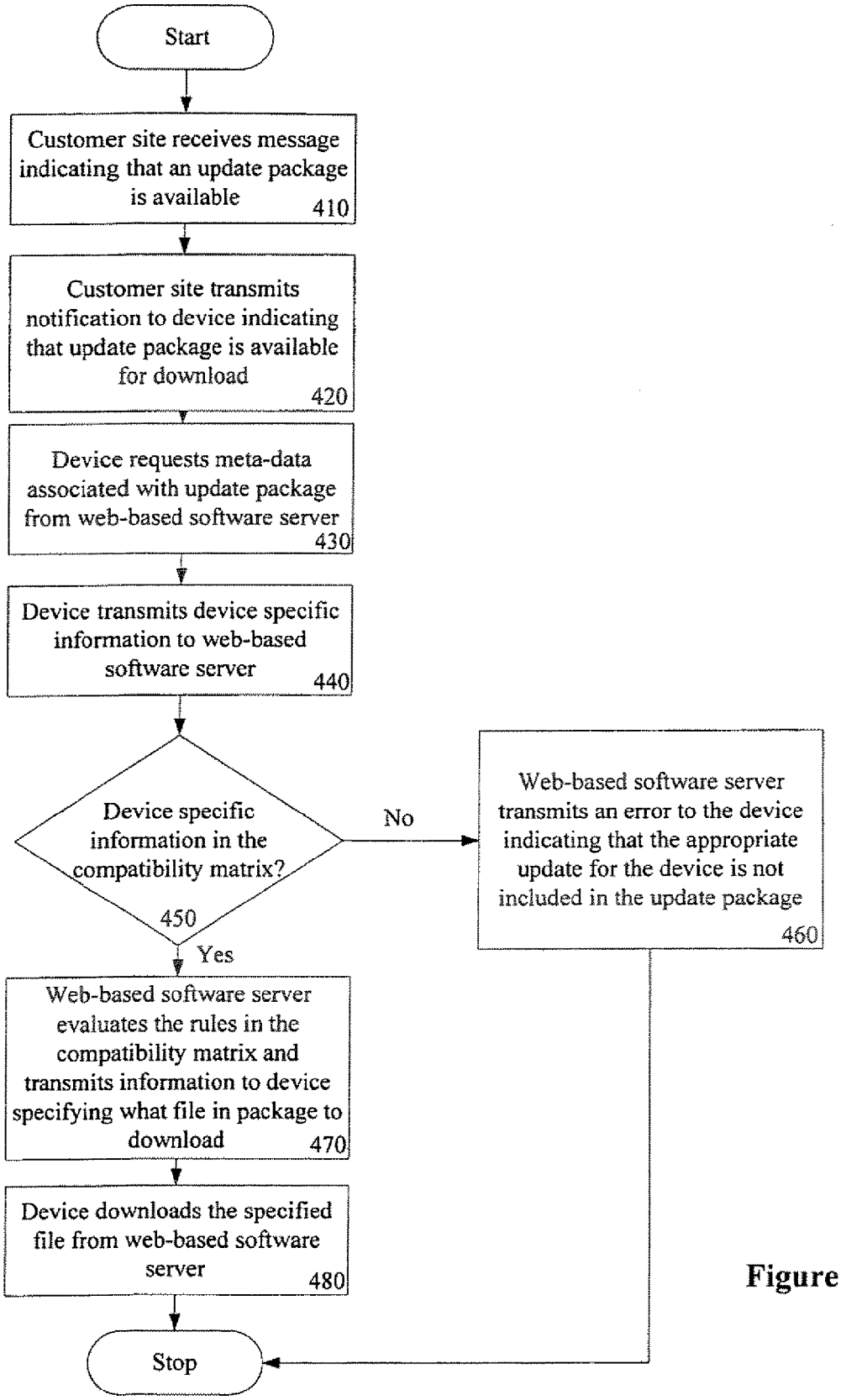
FIG. 4 illustrates one embodiment of a wireless device receiving an update from an update package.

FIG. 4 illustrates one embodiment of a device 130 receiving an update from update package 300. At process block 410, customer site 120 receives a message indicating that update package 300 is available for device 130. At process block 420, customer site 120 transmits a notification to device 130 indicating that update package 300 is available for device 130 to download.

At process block 430, device 130 requests meta-data associated with update package 300 from web-based software server 172. Device 130 transmits device specific information to web-based software server 172, process block 440. At decision block 450, web-based software server 172 checks the device specific information to determine whether the update associated with the device specific information is included in the compatibility matrix.

If the update associated with the device specific information is not included in the compatibility matrix, web-based software server 172 transmits an error to device 130 indicating that the appropriate update for device 130 is not included in update package 300, process block 460.

If the update associated with the device specific information is included in the compatibility matrix, web-based software server 172 evaluates the rules in the compatibility matrix and transmits information to device 130 specifying to device 130 what file in update package 300 to download, process block 470. At process block 480, device 130 downloads the specified file in update package 300 from web-based software server 172.

Receiving an update from an update package allows an IT administrator to globally deploy an update to all users regardless of their locale or language.

In another embodiment, a mechanism to distribute the load placed on a network is described. For Example, a network (e.g. wireless communication link 173) may only be able to handle a limited number of connections at the same time. In one embodiment, the maximum number of connections that can be supported simultaneously is thirty. However, other values may be used.

In order to minimize the number of devices downloading an update from a specific cell tower, a download restriction is associated with the updates.

Figure 5:
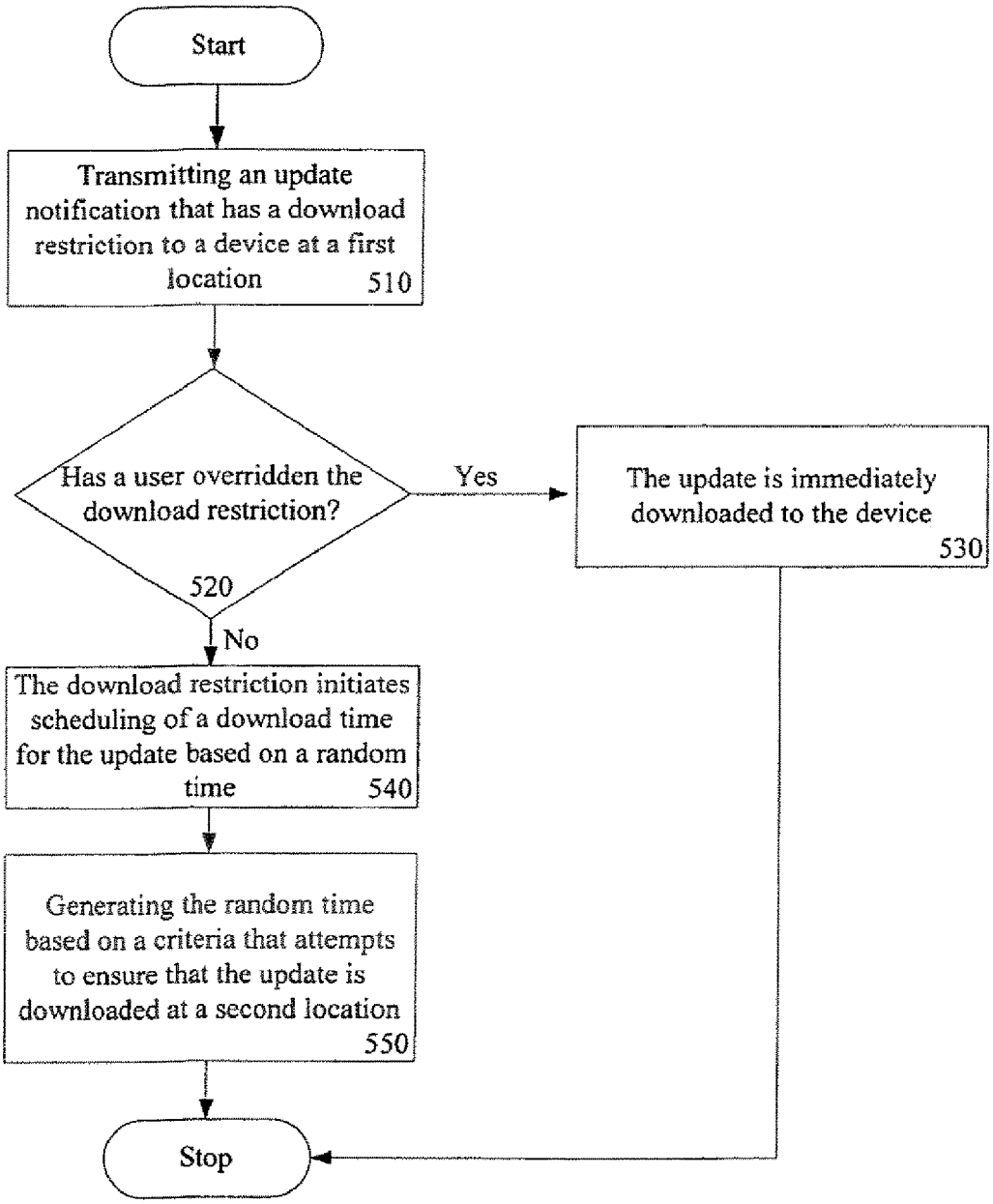
FIG. 5 illustrates one embodiment of restricting where a device is located when it downloads updates.

FIG. 5 illustrates one embodiment of restricting where device 130 is located when it downloads updates. At process block 510, an update notification that has a download restriction associated with it is transmitted to device 130 at a first location. In one embodiment, the first location is an office. At decision block 520, it is determined whether a user has overridden the download restriction. If a user has overridden the download restriction the update is immediately downloaded to device 130, process block 530.

If a user has not overridden the download restriction, the download restriction initiates scheduling of a download time for the update based on a random time, process block 540. At process block 550, the random time is generated based on a criteria. The criteria attempts to ensure that device 130 will download the update at a second location (e.g. a house). In one embodiment, the criteria restricts the random time to after 8 pm and before 2 am. However, other time restrictions may be used.

The above-mentioned process effectively alters the location of a device when the download occurs. The benefit is to distribute the load of downloading updates over a range of cell towers.

Figure 6:
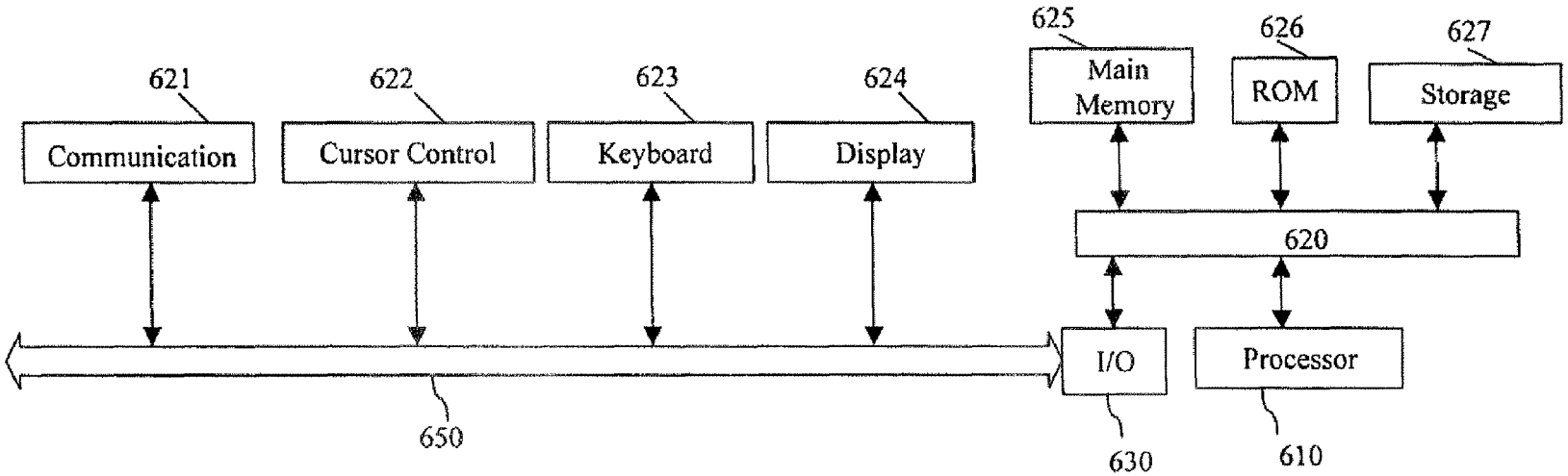
FIG. 6 illustrates one embodiment of a computer system.

FIG. 6 illustrates one embodiment of a computer system 600 on which device 130 and or server 103 may be implemented. Computer system 600 includes a system bus 620 for communicating information, and a processor 610 coupled to bus 620 for processing information. According to one embodiment, processor 610 is implemented using one of the multitudes of Motorola ARM family of processors of microprocessors. Nevertheless one of ordinary skill in the art will appreciate that other processors may be used.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624; an input device (e.g., an alphanumeric input device 623 and/or a cursor control device 622).

The communication device 621 is for accessing other computers (servers or clients) via network 170. The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1); it will be appreciated that the underlying principles of the invention may be implemented on a single client in which the client transmits data over a network. Accordingly, the scope and spirit of the invention should be judged in terms of the claims that follow.

What is claimed is:

1. A method of updating a wireless device, comprising:

a wireless device receiving, *at a first location,* a notification indicating that an update package is available for the wireless device, the update package comprising a plurality of versions of an update;

the wireless device transmitting, in response to receipt of said notification, device-specific information to a server system, the device-specific information comprising compatibility information relating to the wireless device;

the wireless device receiving data specifying a *download* location of a version of the update from the server system, the version having been selected, based on the compatibility information; [and]

the wireless device using the received data to access [said] *the* selected version of the update*; and*

*the wireless device receiving, based on a download restriction, at a predetermined location different from the first location, the selected version of the update from the server system.*

2. The method of claim 1, further comprising*: the wireless device* requesting meta-data associated with the update.

3. The method of claim 1, further comprising:

the server system determining whether the compatibility information is included in a compatibility matrix associated with the update; and the server system transmitting the data specifying [a] *the download* location of [a] *the* version of the update in response to determining that the compatibility information is included in the compatibility matrix.

4. A non-transitory, machine-readable storage medium having stored thereon [data representing sets of] machine-readable instructions which, when executed by a wireless device, [configure] *cause* the wireless device to *perform a method, the method comprising*:

[receive] *receiving, at a first location,* a notification indicating that an update package is available for the wireless device, the update package comprising a plurality of versions of an update;

[transmit] *transmitting*, in response to receipt of the notification, device-specific information to a server system, the device-specific information comprising compatibility information relating to the wireless device;

[receive] *receiving* data specifying a *download* location of a version of the update from the server system, the version having been selected, based on the compatibility information; [and]

[use] *using* the received data to access [said] *the* selected version of the update*; and*

*receiving, based on a download restriction, at a predetermined location different from the first location, the selected version of the update from the server system.*

5. The machine-readable medium of claim 4, wherein [the sets of instructions, when executed by the wireless device, further cause the wireless device to request] *the method further comprises: requesting* meta-data associated with the update.

6. [A] *The* method according to claim 1, wherein the received data comprises a universal resource locator.

7. [A] *The* method according to claim 1, wherein the plurality of versions relate to a plurality of languages.

8. A method of providing an update to a wireless device, comprising:

sending, to a wireless device *at a first location*, a notification indicating that an update package is available for the wireless device, the update package comprising a plurality of versions of an update;

receiving, from the wireless device, device-specific information comprising compatibility information relating to the wireless device;

selecting, based on the received compatibility information, a version of the update from the plurality of versions; [and]

sending data for receipt at the wireless device, the data specifying a *download* location of the selected version*; and*

*providing, based on a download restriction, the selected version to the wireless device when the wireless device is in a predetermined location, the predetermined location being different than the first location.*

9. [A] *The* method according to claim 8, further comprising:

determining whether the compatibility information is included in a compatibility matrix associated with the update; and transmitting the data specifying [a] *the download* location of [a] *the* version of the update in response to determining that the compatibility information is included in the compatibility matrix.

10. [A] *The* method according to claim 8, wherein the data specifying [a] *the download* location of the selected version comprises a universal resource locator with which the selected version can be downloaded.

11. [A] *The* method according to claim 8, wherein the plurality of versions relates to a plurality of languages.

12. [A] *The* method according to claim 8, further comprising [providing updates to a plurality of wireless devices via a network, wherein the method comprises]*:* scheduling [the] *a* timing of [provision of updates] *providing the selected version* to the wireless devices so that no more than a predefined number of updates are simultaneously provided via the network.

[13. A method according to claim 12, further comprising scheduling the provision of the selected version so that the selected version is provided to the wireless device when the wireless device is in a predetermined location.]

14. A server system for providing an update to a wireless device, the server system comprising a processor and [one or more] *a* communications [interfaces] *interface* for communicating with one or more wireless devices, the server system being configured to:

send, to a wireless device *at a first location,* via [said one or more] *the* communications interfaces, a notification indicating that an update package is available for the wireless device, the update package comprising a plurality of versions of an update;

receive, from the wireless device via [said one or more] *the* communications interfaces, device-specific information comprising compatibility information relating to the wireless device;

select, [by]*at* the processor, based on the received compatibility information, a version of the update; [and]

send [data], via [said one or more] *the* communications interfaces, for receipt at the wireless device*, data* specifying a *download* location of the selected version*; and*

*provide, based on a download restriction, the selected version to the wireless device when the wireless device is in a predetermined location, the predetermined location being different than the first location.*

15. [A] *The* system according to claim 14, further comprising*:* a *software* server system storing the plurality of versions.

16. [A] *The* system according to claim 14, further comprising*:* a management console for configuring rules associated with the update.

17. A non-transitory, computer-readable storage medium storing computer readable instructions thereon for execution on a computing system to implement a method of providing an update to a wireless device, the method comprising:

sending, to a wireless device *at a first location*, a notification indicating that an update package is available for the wireless device, the update package comprising a plurality of versions of the update;

receiving, from the wireless device, device-specific information comprising compatibility information relating to the wireless device;

selecting, based on the received compatibility information, a version of the update; [and]

sending data for receipt at the wireless device*, a data* specifying a *download* location of the selected version*; and*

*providing, based on a download restriction, the selected version to the wireless device when the wireless device is in a predetermined location, the predetermined location being different than the first location.*

18. A wireless device [configured to]*, comprising*:

*a memory comprising computer-executable software;*

*a communication interface;*

*a processor in data communication with the memory and the communication interface, the processor being configured to execute the software and cause the wireless device to:* receive*, at a first location,* a notification indicating that an update package is available for the wireless device, the update package comprising a plurality of versions of an update;

transmit, in response to receiving [a said] *the* notification, device-specific information comprising compatibility information relating to the wireless device to a server system;

receive data specifying a *download* location of a version of the update from the server system, the version having been selected[,] based on the compatibility information; and use the received data to access said selected version of the update*; and*

*receive, based on a download restriction, at a predetermined location different from the first location, the selected version of the update from the server system.*

19. A method of updating a wireless device, comprising:

a wireless device receiving, *at a first location,* a notification indicating that an update package is available for the wireless device, the update package comprising a plurality of versions of an update;

the wireless device transmitting, in response to receipt of said notification, device-specific information to a server system, the device-specific information comprising compatibility information relating to the wireless device;

the wireless device receiving data specifying a *download* location of a version of the update from the server system, the version being associated with the compatibility information; [and]

the wireless device using the received data to access [said] *the* selected version of the update*; and*

*the wireless device receiving, based on a download restriction, at a predetermined location different from the first location, the selected version of the update from the server system.*

*20. A method of distributing software, comprising, at a server system comprising memory and one or more processors:*

*receiving a software package for distribution, the software package having rules associated therewith;*

*identifying a wireless device to which to provide the software package, based on the rules and device-specific information stored in the memory; and*

*providing the software package via a wireless network to the identified wireless device when the identified wireless device is at a first location; and*

*restricting provision of the software package to the identified wireless device, so that the software package is provided to the identified wireless device at a predetermined location, the predetermined location being different than the first location.*

*21. The method of claim 20, further comprising, at the server system:*

*providing the software package to each of a plurality of identified wireless devices via a respective connection; and*

*configuring two or more of the connections so as to restrict simultaneous provision of the software package.*

*22. The method of claim 21, further comprising, at the server system:*

*scheduling a time for the provision of the software package to the plurality of identified wireless devices.*

*23. The method of claim 21, further comprising, at the server system: setting a random time to provide the software package to the plurality of identified wireless devices.*

*24. The method of claim 20, wherein the software package comprises an update package.*

*25. A server system for distributing software, the server system comprising:*

*memory comprising executable software and device specific information for each of a plurality of wireless devices; and one or more processors configured to execute the executable software and cause the server system to:*

*receive a software package for distribution, the software package having rules associated therewith;*

*identify, at the processor, based on the device specific information and the rules, a wireless device to which to provide the software package;*

*provide the software package, via a wireless network, to the identified wireless device when the identified wireless device is at a first location; and*

*restrict provision of the software package to the identified wireless device, so that the software package is provided to the identified wireless device at a predetermined location, the predetermined location being different than the first location.*

*26. The server system of claim 25, further configured to:*

*provide the software package to each of a plurality of identified wireless devices via a respective connection; and*

*configure two or more of the connections so as to restrict simultaneous provision of the software package.*

*27. The server system of claim 26, further configured to: schedule a time for the provision of the software package to the plurality of identified wireless devices.*

*28. The server system of claim 26, further configured to: set a random time to provide the software package to the plurality of identified wireless devices.*

*29. The server system of claim 25, wherein the software package comprises an update package.*

*30. A non-transitory computer-readable storage medium storing computer readable instructions thereon for execution on a computing system to implement a method of distributing software, the method comprising:*

*receiving a software package for distribution, the software package having rules associated therewith;*

*identifying a wireless device to which to provide the software package, based on the rules and device-specific information stored in a memory of the computing system;*

*providing the software package via a wireless network to the identified wireless device when the identified wireless device is at a first location; and*

*restricting provision of the software package to the identified wireless device, so that the software package is provided to the identified wireless device at a predetermined location, the predetermined location being different than the first location.*

*31. The non-transitory computer-readable storage medium of claim 30, wherein the method further comprises:*

*providing the software package to each of a plurality of identified wireless devices via a respective connection; and*

*configuring two or more of the connections so as to restrict simultaneous provision of the software package.*

*32. The non-transitory computer-readable storage medium of claim 31, wherein the method further comprising:*

*scheduling a time for the provision of the software package to the identified plurality of wireless devices.*

*33. The non-transitory computer-readable storage medium of claim 31, wherein the method further comprises:*

*setting a random time to provide the software package to the plurality of identified wireless devices.*

*34. The non-transitory computer-readable storage medium of claim 30, wherein the software package comprises an update package.*

* * * * *